United States Patent [19]

Nagano et al.

[11] 3,744,121

[45] July 10, 1973

[54] PROCESS FOR SOLDERING DIFFICULTLY SOLDERABLE METALS, SUCH AS SI, GE, AL, TI, ZR AND TA

[75] Inventors: Kentaro Nagano; Noyji Nomaki; Yoshihito Saoyama, all of Yokohama, Japan

[73] Assignee: Asahi Glass Company, Limited, Tokyo, Japan

[22] Filed: Nov. 19, 1970

[21] Appl. No.: 91,208

[30] Foreign Application Priority Data

Aug. 15, 1970 Japan ............................ 45/71487

[52] U.S. Cl. ....................... 29/502, 29/503, 29/504, 75/166 C

[51] Int. Cl. ........................................... B23k 35/12

[58] Field of Search ..................... 29/504, 502, 503; 75/166 C

[56] References Cited

UNITED STATES PATENTS

| | | | |
|---|---|---|---|
| 2,298,237 | 10/1942 | Smith, Jr. et al. | 75/166 |
| 2,397,400 | 3/1946 | Barwick | 20/503 X |
| 2,426,650 | 9/1942 | Sivian | 20/502 X |
| 2,522,082 | 9/1950 | Arnold | 20/503 UX |
| 2,737,712 | 3/1956 | Larson | 29/503 |
| 2,824,543 | 2/1958 | Brown | 20/503 X |
| 3,266,136 | 8/1966 | Gutbier | 29/503 X |

FOREIGN PATENTS OR APPLICATIONS

| | | | |
|---|---|---|---|
| 13,877 | 1851 | Great Britain | 75/166 |
| 236,747 | 7/1925 | Great Britain | 75/166 |

*Primary Examiner*—J. Spencer Overholser
*Assistant Examiner*—Ronald J. Shore
*Attorney*—Oblon, Fisher & Spivak

[57] ABSTRACT

Difficulty solderable metals, such as Si, Ge, Al, Ti, Zr and Ta are soldered using a solder alloy composed of 40 – 98 wt. % Pb, 1.8 – 50 wt. % Sn, 0.05 – 10 wt. % Zn and 0.05 – 10 wt. % Sb, while applying vibration, preferably ultrasonic vibration.

8 Claims, No Drawings

PROCESS FOR SOLDERING DIFFICULTLY SOLDERABLE METALS, SUCH AS SI, GE, AL, TI, ZR AND TA

BACKGROUND OF THE INVENTION

1. Field Of The Invention

This invention relates to new use for Pb-Sn-Zn-Sb or Pb-Sn-Zn-Sb-Al type solder alloys. More particularly, this invention relates to a process for directly soldering difficulty solderable metals such as Si, Ge, Al, Ti, Zr and Ta.

2. Description Of The Prior Art

Heretofore, it has been necessary to apply a preliminary plating of copper, gold or nickel to a silicon or germanium semiconductor in order to prepare the semiconductor to receive a solder material. For example, silicon semiconductor substrates have been prepared by frictionally applying gold to the semiconductor substrate and heating the gold at temperatures above 370°C to form a gold-silicon eutectic which can adherently receive a solder coat. Another technique for preparing a silicon or germanium substrate to receive a solder is to electroplate copper, gold or nickel prior to applying the solder.

Although such indirect soldering techniques do provide a relatively good solder bond, such procedures are expensive and are frequently complex. Moreover, such techniques as metal plating are undesirable since they can adversely affect the electrical characteristics of the semiconductor.

It would be most desirable to directly apply a solder to a semiconductor metal, however, heretofore, those direct solder techniques described in the prior art, did not result in sufficient adhesive qualities.

Particularly difficult soldering problems have been found where attempts are made to apply a solder directly to Al, Ti, Zr or Ta, which are frequently covered with an oxidation layer, caused by air oxidation. In these instances, it has been almost mandatory according to the prior art to rely on indirect soldering procedures. For instance, it has been disclosed that in order to solder aluminum, it is necessary to coat the aluminum with a suitable flux and then heat the surface to a temperature of between 300° – 400°C. While this technique has proven to be somewhat effective, it is a fairly expensive procedure.

The need exists, therefore, for a technique for directly applying a solder to certain difficultly solderable metals. It would be necessary, however, for such technique, to be capable of providing a solder bond of high tenacity.

SUMMARY OF THE INVENTION

Accordingly, it is an object of this invention to provide a process for directly applying solder to a difficultly solderable metal wherein the adhesive strength of the solder bond is greater than the tensile strength of the solder itself.

Another object of this invention is to provide a process for applying a solder to silicon or germanium semiconductors whereby the electrical properties of the semiconductor will not be adversely affected.

A further object of this invention is to provide a process for applying solder to aluminum, titanium, zirconium or tantalum so as to provide a highly tenacious solder bond.

These and other objects now and herein have been attained by the use of a solder alloy which is composed predominantly of Pb, Sn, Zn and Sb, wherein the adhesive properties of the solder are enhanced by the use of vibration, such as ultrasonic vibration during the soldering procedure.

DETAILED DESCRIPTION OF PREFERRED EMBODIMENTS

The alloy used in this invention, is predominantly composed of Pb, Sn, Zn and Sb, and has the following composition, as expressed in wt. %:

| | |
|---|---|
| Pb | 40 – 98% |
| Sn | 1.8 – 50% |
| Zn | 0.05 – 10% |
| Sb | 0.05 – 10% |
| Al | 0 – 0.1% |
| Si | 0 – 0.1% |
| Ti | 0 – 0.1% |
| Be | 0 – 0.1% |

The presence of aluminum, silicon, titanium and beryllium are optional metals which may be totally omitted if desired.

Preferably, the solder alloy of the present invention should have the following composition as expressed in wt. %:

| | |
|---|---|
| Pb | 81 – 93% |
| Sn | 3 – 9% |
| Zn | 1.5 – 6% |
| Sb | 0.5 – 4% |
| Al | 0 – 0.1% |
| Si | 0 – 0.1% |
| Ti | 0 – 0.1% |
| Be | 0 – 0.1% |

If the quantity of lead in the solder is less than 40% by wt., or the quantity of tin in the solder is more than 50% by wt., the solder alloy formed on the metal surface will tend to be too thin which will adversely affect the adhesive strength of the bond. Conversely, if the quantity of lead in the solder exceeds 98% by wt., or the quantity of the tin in the solder is less than 1.8% by wt., the strength of the bond between the solder and the metal will be unsatisfactorily low and the soldering operation must be conducted at undesirably high temperatures. This can result in oxidative degradation of the solder, which in turn will adversely affect the working quality of the solder, and, when the difficulty solderable material is a semi-conductor, can cause breakage.

If the solder contains less than 0.5% by wt. of zinc, the bonding strength of the solder will be quite poor, whereas if the solder contains an excess of 10% by wt. of zinc, the solder will be characterized by an inferior ductility and water resistance. If antimony is present in amounts of less than 0.5% by wt., the solder will be characterized by a very poor water resistance, whereas if there is greater than 10% by wt. of antimony present, it will result in reduced solder ductility.

Aluminum may be added to the alloy in amounts of less than 0.1% by wt. in order to prevent the formation of a scale due to oxidation of the solder during the soldering operation. Good results are obtainable if the aluminum is added in amounts of from 0.1 – 0.01% wt. and preferably in amounts from 0.05 – 0.02% wt. If the quantity of aluminum exceeds 0.1% by wt., the bond strength of the solder will be adversely affected.

In addition, one or more members of the group consisting of silicon, titanium, and beryllium may be incorporated into the solder in a combined amount of no more than 0.5% wt. These components can assist in the prevention of fogging or delustering of the solder surface. More specifically, these elements can be added in a combined amount of from 0.02 – 0.05 wt. % and can preferably be present in amounts of from 0.15 – 0.06 wt. %. If the total quantity of silicon, titanium and beryllium exceeds 0.5% wt., the bond strength of the solder may be reduced.

Since silicon, titanium and beryllium are very high melting elements, it would be difficult to add these metals directly to the composition in their free metallic form. It is preferred, therefore, to introduce these metals to the solder composition in the form of mother alloys with copper or aluminum. Suitable mother alloys include the alloys of 75% Cu – 25% Ti; 85% Cu – 15% Si; and 96%Cu – 4% Be. In this instance about 1–3 percent copper will enter the solder composition. Although such small amounts of copper will not adversely affect the properties of the solder, the quantity of copper should not exceed 3 percent.

In the process for producing the solder alloy, the metal components are melted and mixed in a suitable crucible. Air, oxygen or an oxygen generating material is preferably injected into the melt in order to modify the viscosity and surface tension, without causing the formation of a slag. This tends to oxidize the alloy component, which has been found to increase the adhesive strength of the ultimate solder.

The solder is directly applied to the difficultly solderable metal while applying vibration, such as ultrasonic vibration. The solderable material is then adhered to the difficulty solderable metal by contacting the solderable material to the solder and heating. A wide variety of solderable materials can be applied to difficulty solderable metals using this technique. For instance, this technique is applicable for applying such solderable materials as solderable metals, glasses, ceramics, pottery, porcelain, refractory oxides and quartz crystals.

Although it is not completely understood, it is believed that a difficultly of conventional prior art solders has been their inability to form adherent bonds to oxide surfaces. The difficulty solderable metals, such as silicon, germanium, aluminum, titanium, zirconium and tantalium, however, frequently have very thin oxide layers surrounding all of their exposed surfaces, caused by air oxidation. Although the thickness of these oxide layers is quite thin, it nevertheless makes soldering with conventional solder alloys very difficult.

The soldering technique of the present invention, however, is believed to be especially unique in that upon the application of vibration, especially ultrasonic vibration, the solder alloy seems to react with the thin oxide layer to form a very tenacious bond. While the mechanism for this phenomenon is not understood, it has been confirmed that when the techniques of the present invention are used, the solder alloy shows an unpredictably great affinity to the extremely thin oxide layers covering the difficulty solderable metal. The adhesive strength is so high, that in some instances, it appeared to be greater than the tensile strength of the difficultly solderable material. This unique phenomenon, however, is only found when using the particular alloy as disclosed herein.

In carrying out the process of this invention, it is preferable to rub the surface of the difficultly solderable metal with the solder alloy at a suitable temperature. Various types of vibration are suitable for providing this type of friction. Especially good results are obtainable when using ultrasonic vibration at a frequency of 20 – 30 kilocycles in a direction parallel to the soldering surface. Although it is ordinarily difficult to adher the solder alloy to the above mentioned difficulty solderable metals, using the techniques of this invention, solder layers of from 0.02mm to 0.2mm can be obtained.

The solder coated surface of the difficultly solderable metal can be adhered to other metals, glasses, ceramics, quartz crystals, pottery, porcelain, refractory oxides or the like, by simply heating the contact area.

In order to provide a suitable degree of vibration, especially ultrasonic vibration, a soldering spatula is preheated to about 200° C – 400° C and is adapted to vibrate in a direction parallel to the surface of the difficultly solderable metal.

The results are obtainable when the spatula is caused to vibrate in the ultrasonic frequency of 20 – 30 kilocycles. During this operation, the soldering spatula will apply a frictional force to the surface of the difficultly solderable metal, which tends to improve its surface activity. This technique provides a remarkably strong bond between the solder and the oxide surface of the difficultly solderable metal. Vibration can be provided by the use of a vibrating generator which transfers the vibration through a transferring rod to the tip of the soldering spatula.

Where the difficultly solderable metal is a silicon or a germanium semiconductor, the semiconductor can be in the shape of a wafer, rod, or other form. The silicon or germanium may be in a highly pure state or may be in composition with various impurity materials. The solder techniques of the present invention can be used for forming metal-semiconductor bonds, semiconductor-semiconductor bonds, glass-semiconductor bonds or ceramic-semiconductor bonds, and can be used for the production of headers, semiconductor leads, thyristor devices, etc.

Although the difficultly solderable metals have been specified as aluminum, titanium, zirconium, tantalum, silicon and germanium, other difficultly solderable materials can be treated in a similar manner. For example, alloys of the above metals with each other or with other metals can be treated in accordance with the present invention.

Having generally described the invention, a further understanding can be obtained by certain specific examples which are provided herein for purposes of illustration only and are not intended to be limiting in any manner.

EXAMPLES

Example 1

A solder alloy as specified in Table I was applied to a silicon single-crystal water (thickness 0.3 mm) by applying 20 KHz of ultrasonic vibration to the crystal surface, using the tip of a soldering spatula in order to transfer the vibration from a vibrating generator. The solder was applied at a temperature of 300°C. The thickness of the coated solder layer was about 0.2 mm. A copper-nickel plate was adhered to the crystal wafer using the solder coating and heat. For comparison, solder alloys outside the scope of the present invention were used with the same technique in an attempt to bond a copper-nickel plate to a silicon wafer. These results are also summarized in the following table.

TABLE I

| Number | Composition, weight percent | | | | | | | | Properties adhesiveness | Water resistance |
|---|---|---|---|---|---|---|---|---|---|---|
| | Pb | Sn | Zn | Sb | Al | Si | Ti | Be | | |
| 1 | 81 | 9 | 6 | 6 | | | | | Excellent | Excellent. |
| 2 | 93 | 4 | 2 | 1 | | | | | do | Do. |
| 3 | 95 | 3 | 1.5 | 0.5 | | | | | do | Do. |
| 4 | 40 | 50 | 5 | 5 | | | | | do | Do. |
| 5 | 45 | 40 | 10 | 5 | | | | | do | Do. |
| 6 | 79 | 6 | 5 | 10 | | | | | do | Do. |
| 7 | Same with No. 1 | | | | 0.02 | | | | do | Do. |
| 8 | Same with No. 2 | | | | 0.05 | | | | do | Do. |
| 9 | Same with No. 3 | | | | 0.07 | | | | do | Do. |
| 10 | Same with No. 4 | | | | 0.02 | | | | do | Do. |
| 11 | Same with No. 5 | | | | 0.05 | | | | do | Do. |
| 12 | Same with No. 6 | | | | 0.07 | | | | do | Do. |
| 13 | Same with No. 1 | | | | 0.01 | | | | do | Do. |
| 14 | Same with No. 3 | | | | 0.01 | | | | do | Do. |
| 15 | Same with No. 4 | | | | 0.01 | | | | do | Do. |
| 16 | Same with No. 6 | | | | 0.01 | | | | do | Do. |
| 17 | Same with No. 1 | | | | 0.02 | 0.05 | | | do | Do. |
| 18 | Same with No. 2 | | | | 0.05 | | 0.05 | | do | Do. |
| 19 | Same with No. 3 | | | | 0.07 | | | 0.05 | do | Do. |
| 20 | Same with No. 4 | | | | 0.05 | 0.05 | 0.05 | | do | Do. |
| 21 | Same with No. 5 | | | | 0.05 | 0.05 | 0.05 | 0.05 | do | Do. |
| 22 | Same with No. 6 | | | | 0.07 | 0.02 | | 0.07 | do | Do. |
| 23 | 81 | 19 | | | | | | | Weak | Weak. |
| 24 | 93 | 7 | 11 | | | | | | do | Do. |
| 25 | 80 | 9 | 11 | | | | | | do | Do. |
| 26 | 81 | 9 | | 10 | | | | | do | Do. |
| 27 | 63 | 37 | | | | | | | do | Do. |
| 28 | 43 | 56 | | 1 | | | | | do | Do. |
| 29 | 72 | 26.85 | | 1 | 0.1 | 0.05 | | | do | Do. |
| 30 | 30 | 62 | 5 | 3 | | | | | do | Do. |
| 31 | 99 | 0.5 | 0.3 | 0.2 | | | | | do | Do. |
| 32 | 35.8 | 60 | 3.0 | 1.2 | | | | | do | Do. |
| 33 | 92 | 5 | 0.01 | 2.99 | | | | | do | Do. |
| 34 | 81 | 12 | 15 | 12 | | | | | do | Do. |

In this table, the term "excellent" is intended to indicate the condition at which the semiconductor wafer failed but no stripping of the soldered surface occurred. The term "weak" is intended to indicate the condition at which the solder was stripped from the surface before the semiconductor wafer failed. (i.e. no adhesion)

In measuring water resistance, the term "excellent" is intended to indicate that condition at which no decrease of adhesive strength was found even after placed into boiling water for 6 hours. The term "weak" is intended to indicate that condition at which the adhesive strength of the solder was shown to be inadequate after boiling in water for 6 hours.

It should be noted that compositions 1–22, respectively, in Table I, describe solder alloys within the scope of the present invention. Compositions 1–6 consist of lead, tin, zinc and antimony; and compositions 7–16 contain in addition, amounts of aluminum. Compositions 17–22 do not contain aluminum but in addition do contain silicon, titanium and beryllium. The content of the lead, zinc, tin and antimony in compositions 7–22are therefore lower than the corresponding compositions 1–6. Compositions 23–24 define solder alloys where are outside the scope of the present invention.

As shown in the table the solder alloys of the present invention have excellent adhesive properties and excellent water resistance properties.

Example 2

Two single germanium crystal wafers (thickness 0.35 mm) were soldered with an alloy consisting of 91.2 % Pb, 4.8% Sn, 3.0% Zn and 1.0% Sb. The soldering temperature was 350°C and the solder spatula was provided for ultrasonic vibration. Adhesive tests of the solder bond, showed that the solder alloy adhered in an excellent manner to the surface of the wafers.

Example 3

A multi-crystal silicon wafer having dimensions of 10 mm × 10 mm × 2 mm, was soldered with an alloy consisting of 36.6% Pb, 59.4% Sn, 3.0% Zn and 1.0% Sb. The soldering temperature was 450°C and the solder spatula was provided for ultrasonic vibration. A copper lead wire was dipped into a crucible containing molten solder alloy. The solder coated copper lead wire was then contacted to the solder layer and the contact surface was heated.

The adhesive strength between the silicon and copper lead wire was found to be so high than in one tensile strength test, the silicon failed before the soldered phase was stripped from the surface.

Example 4

Two titanium plates having dimensions of 50mm × 50mm × 1 mm which were covered with a thin oxidized membrane-like coating, were soldered with an alloy consisting of 91.2% Pb, 4.8% Sn, 3% Zn and 1% Sb. The solder temperature was 350°C and the solder spatula was provided for ultrasonic vibration. In a tensile strength test, the tensile strength of the solder bond was found to be 300 kg/cm$^2$, which is the tensile strength of the solder alloy itself.

Example 5

Two aluminum plates, covered with thin oxidized membrane-like surfaces, were soldered with an alloy consisting of 87% Pb, 9.5% Sn, 2% Zn and 1% Sb, using a solder spatula which was provided for ultrasonic vibration. In a tensile strength test, it was discovered that the tensile strength of the bond was 300 kg/cm$^2$, which is the same tensile strength as the solder alloy itself.

Example 6

A zirconium plate having dimensions of 15mm × 15mm × 0.5mm, was soldered using an alloy consisting of 66.4% Pb, 28.36% Sn, 2.84% Zn, 1.89% Sb, 0.04% Al, 0.38% Cu, 0.04% Si and 0.05% Ti. The soldering temperature was 300°C. Ultrasonic vibration was used.

A piece of chronium-8 nickel stainless steel was coated with the same solder alloy and was contacted with the solder alloy of the zirconium plate.

The tensile strength of the solder bond was found to be 400 kg/cm$^2$, which is the same as the tensile strength of the alloy itself.

Example 7

A series of aluminum plates containing oxidized surfaces, were coated with solder alloys as shown in Table 2. The soldering temperature was 300°C. Ultrasonic vibration was used having a frequency of 20 KHz. The thickness of the solder layer was about 0.2 mm. Each aluminum plate after being coated with the solder alloy was cut into two pieces and the solder layer of one piece was contacted with the solder layer of another piece. Adhesion was provided by heating. The adhesive strength and water resistance of each test plate is shown in Table 2. The results of adhesive and water resistance tests are described using the same terminology as defined in Table 1.

TABLE 2

| Number | Pb | Sn | Zn | Sb | Al | Si | Ti | Be | Properties adhesiveness | Water resistance |
|---|---|---|---|---|---|---|---|---|---|---|
| 1 | 81 | 9 | 6 | 4 | | | | | Excellent | Excellent. |
| 2 | 93 | 4 | 2 | 1 | | | | | do | Do. |
| 3 | 95 | 3 | 1.5 | 0.5 | | | | | do | Do. |
| 4 | 40 | 50 | 5 | 5 | | | | | do | Do. |
| 5 | 45 | 40 | 10 | 5 | | | | | do | Do. |
| 6 | 79 | 6 | 5 | 10 | | | | | do | Do. |
| 7 | Same with No. 1 | | | | 0.02 | | | | do | Do. |
| 8 | Same with No. 2 | | | | 0.05 | | | | do | Do. |
| 9 | Same with No. 3 | | | | 0.07 | | | | do | Do. |
| 10 | Same with No. 4 | | | | 0.02 | | | | do | Do. |
| 11 | Same with No. 5 | | | | 0.05 | | | | do | Do. |
| 12 | Same with No. 6 | | | | 0.07 | | | | do | Do. |
| 13 | Same with No. 1 | | | | 0.01 | | | | do | Do. |
| 14 | Same with No. 3 | | | | 0.01 | | | | do | Do. |
| 15 | Same with No. 4 | | | | 0.01 | | | | do | Do. |
| 16 | Same with No. 6 | | | | 0.01 | | | | do | Do. |
| 23 | 81 | 19 | | | | | | | Weak | Weak. |
| 24 | 93 | 7 | 11 | | | | | | do | Do. |
| 25 | 80 | 9 | 11 | | | | | | do | Do. |
| 26 | 81 | 9 | | 10 | | | | | do | Do. |
| 27 | 63 | 37 | | | | | | | do | Do. |
| 28 | 43 | 56 | | 1 | | | | | do | Do. |
| 29 | 72 | 26.85 | | 1 | 0.1 | | 0.05 | | do | Do. |
| 30 | 30 | 62 | 5 | 3 | | | | | do | Excellent. |
| 31 | 99 | 0.5 | 0.3 | 0.2 | | | | | do | Do. |
| 32 | 35.8 | 60 | 3.0 | 1.2 | | | | | do | Do. |
| 33 | 92 | 5 | 0.01 | 2.99 | | | | | do | Do. |
| 34 | 81 | 12 | 15 | 12 | | | | | do | Do. |

Having now fully described the invention, it will be apparent to one of ordinary skill in the art that many changes and modifications can be made thereto without departing from the spirit or scope of the invention.

Accordingly what is claimed and intended to be covered by Letters Patent is:

1. A process for bonding a solderable material to a semiconductor metal having an oxidized surface which comprises: contacting said difficultly solderable metal with a solder consisting essentially of:

| | |
|---|---|
| Pb | 81 – 93% |
| Sn | 3 – 93% |
| Zn | 1.5 – 6% |
| Sb | 0.5 – 4% |
| Al | 0 – 0.1% |
| Si | 0– 0.1% |
| Ti | 0 – 0.1% |
| Be | 0 – 0.1% |

while applying vibration to the portion of contact of said solder and said semiconductor metal to form a solder coated product, contacting said solderable material to the solder layer of said solder coated semiconductor metal and applying heat to the portion of contact.

2. The process of claim 1, wherein heat is applied to the portion of contact of said solder metal and said semiconductor metal.

3. A process for bonding a solderable material to a difficultly solderable metal having an oxidized surface which comprises; contacting said difficultly solderable metal with a solder consisting essentially of 40 – 98 wt. % Pb; 1.8 – 50 25. % wt. 0.05 – 10 wt. % Zn; 0.05 – 10 wt. % Sb; 0 – 0.1 wt. % Al; 0 – 0.1 wt. % Si; 0 – 0.1 wt. % Ti and 0 – 0.1 wt. % Be; while applying vibration to the portion of contact between said solder and said difficulty solderable metal to form a solder coated product, contacting said solderable material to the solder layer of said solder coated difficultly solderable metal and applying heat to the portion of contact.

4. The process of claim 3, wherein said solderable material is selected from the group consisting of: solderable metal, glass, ceramic, pottery, porcelain, refractory oxide and quartz crystal.

5. A process for bonding a metal article to a difficultly solderable metal which comprises; coating said metal article with a solder alloy consisting essentially of 40 – 98 wt. % Pb; 1.8 – 50 wt. % Sn; 0.05 – 10 wt. % Zn; 0.05 – 10 wt. % Sb; 0 – 0.1 wt. % Al; 0 –0.1 wt. % Si; 0 – 0.1 wt. % Ti and 0 – 0.1 wt. % Be, contacting the solder layer with said solder coated metal plate with a difficultly solderable metal, heating the portion of contact between said solder layer and said difficultly solderable metal, so as to melt said solder, while applying vibration to said portion of contact, solidifying said solder so as to form an adherent bond between said metal article and said difficultly solderable metal.

6. The process of claim 3 wherein said vibration is applied parallel to the soldering surface.

7. The process of claim 5 wherein the vibration is applied to the solder coated metal article.

8. The process of claim 5 wherein said vibration is applied to the difficultly solderable metal.

* * * * *